United States Patent
Witting

(10) Patent No.: US 10,378,257 B2
(45) Date of Patent: Aug. 13, 2019

(54) NUT FOR THREADED HINGE PIN

(71) Applicant: Adam C Witting, Sterling Heights, MI (US)

(72) Inventor: Adam C Witting, Sterling Heights, MI (US)

(73) Assignee: FCA US LLC, Auburn Hills, CA (US)

( * ) Notice: Subject to any disclaimer, the term of this patent is extended or adjusted under 35 U.S.C. 154(b) by 0 days.

(21) Appl. No.: 15/659,720

(22) Filed: Jul. 26, 2017

(65) Prior Publication Data
US 2019/0032381 A1   Jan. 31, 2019

(51) Int. Cl.
*E05D 5/12* (2006.01)
*E05D 7/10* (2006.01)
*F16B 37/00* (2006.01)
*F16B 37/08* (2006.01)
*E05D 3/02* (2006.01)

(52) U.S. Cl.
CPC .............. *E05D 5/121* (2013.01); *F16B 37/00* (2013.01); *E05D 3/02* (2013.01); *E05D 7/1044* (2013.01); *E05D 2005/122* (2013.01); *E05Y 2600/41* (2013.01); *E05Y 2600/61* (2013.01); *E05Y 2600/624* (2013.01); *E05Y 2900/531* (2013.01); *F16B 37/0864* (2013.01); *F16B 37/0885* (2013.01)

(58) Field of Classification Search
CPC .............. F16B 37/0864; F16B 37/0885; E05D 7/1044; E05D 5/121
See application file for complete search history.

(56) References Cited

U.S. PATENT DOCUMENTS

| 781,110 A | * | 1/1905 | Stulz | F16B 13/068 411/26 |
| 1,241,432 A | * | 9/1917 | Peltz | F16B 37/0864 411/433 |
| 2,789,458 A | * | 4/1957 | Skeisvoll | F16B 37/0821 411/433 |
| 2,882,781 A | * | 4/1959 | Gates | F16B 37/0892 411/3 |
| 3,233,499 A | * | 2/1966 | Gale | F16B 37/0864 411/434 |
| 3,312,264 A | * | 4/1967 | Dresdner | F16B 37/0864 411/270 |
| 3,887,990 A | * | 6/1975 | Wilson | B23P 11/02 29/450 |
| 4,800,623 A | * | 1/1989 | Brockhaus | E05D 5/12 16/254 |
| 4,854,009 A | * | 8/1989 | Brockhaus | E05D 5/12 16/263 |
| 4,858,274 A | * | 8/1989 | Harrison | E05D 7/1044 16/265 |
| 5,027,671 A | * | 7/1991 | Erikson | F16H 25/2009 411/270 |

(Continued)

*Primary Examiner* — Jeffrey O'Brien
(74) *Attorney, Agent, or Firm* — Ralph E Smith

(57) ABSTRACT

In at least one implementation, a nut for a hinge pin includes a head and a sidewall portion extending from the head to a free end. The sidewall portion includes at least one void that defines part of at least one sidewall section. The void extends radially through the sidewall portion and along at least part of the axial extent of the sidewall portion including the free end so that the free end of the sidewall portion is not circumferentially continuous.

15 Claims, 4 Drawing Sheets

(56) References Cited

U.S. PATENT DOCUMENTS

| | | | | |
|---|---|---|---|---|
| 5,139,381 A * | 8/1992 | Lubreski | ............. | F16B 37/0857 411/267 |
| 5,152,651 A * | 10/1992 | Arteon | ................ | F16B 37/0821 411/433 |
| 5,706,556 A * | 1/1998 | Kluting | ..................... | E05D 5/10 16/260 |
| 5,987,703 A * | 11/1999 | Kluting | .................. | E05D 5/121 16/262 |
| 6,063,090 A * | 5/2000 | Schlapfer | ............ | A61B 17/7037 606/270 |
| 6,116,806 A * | 9/2000 | Chang | .................. | G06F 1/1616 16/342 |
| 6,922,872 B2 * | 8/2005 | Gruber | ................... | E05D 5/062 16/222 |
| 6,974,291 B2 * | 12/2005 | Li | ....................... | F16B 37/0864 411/267 |
| 7,981,143 B2 * | 7/2011 | Doubler | .............. | F16B 37/0864 606/300 |
| 8,028,594 B2 * | 10/2011 | Schroeder | ........... | F16B 37/0864 74/424.95 |
| 8,231,318 B2 * | 7/2012 | Pitsch | ................. | F16B 37/0864 411/270 |
| 9,289,246 B2 * | 3/2016 | Biedermann | ...... | A61B 17/7034 |
| 9,309,704 B2 * | 4/2016 | Gouge | ..................... | E05D 3/02 |
| 9,534,431 B2 * | 1/2017 | Gouge | ..................... | E05D 3/02 |
| 9,637,893 B2 * | 5/2017 | Lin | ....................... | E03C 1/0401 |
| 10,000,952 B2 * | 6/2018 | Gouge | ..................... | E05D 3/02 |
| 2003/0156922 A1 * | 8/2003 | Giehl | .................. | F16B 37/0864 411/432 |
| 2006/0273621 A1 * | 12/2006 | Shaw | ..................... | E05D 7/1044 296/146.11 |
| 2007/0160441 A1 * | 7/2007 | Reindl | ................ | F16B 37/0864 411/433 |
| 2009/0297294 A1 * | 12/2009 | Li | ........................ | F16B 37/0864 411/433 |
| 2010/0186340 A1 * | 7/2010 | Nakamura | ............. | E04C 5/122 52/684 |
| 2015/0345672 A1 * | 12/2015 | Smith | ................ | F16L 37/1215 285/81 |

* cited by examiner

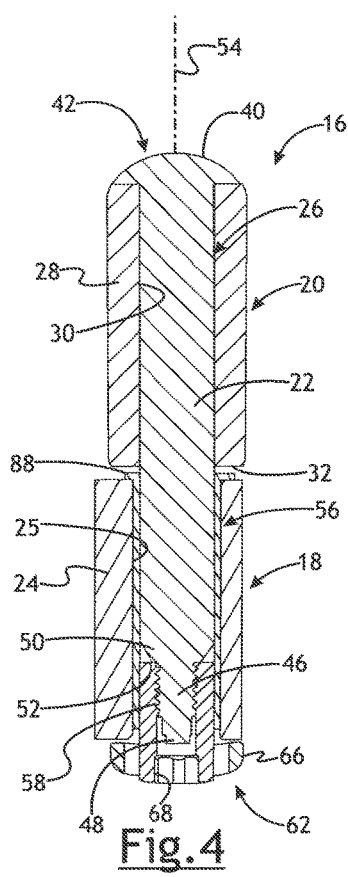
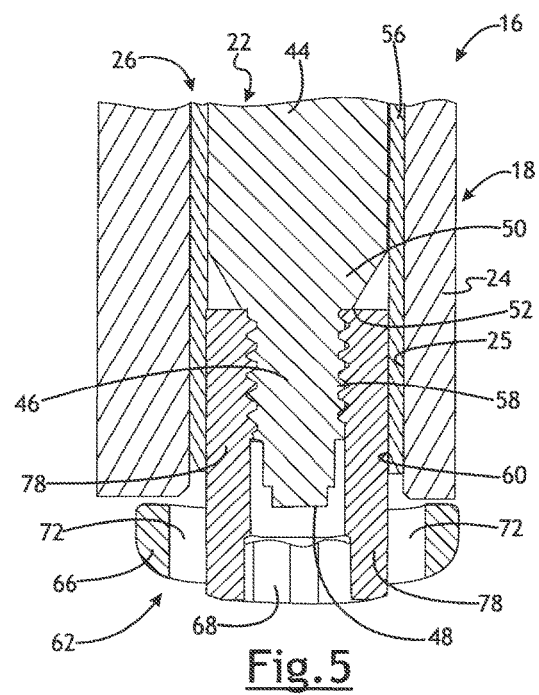

NUT FOR THREADED HINGE PIN

FIELD

The present disclosure relates to a nut for a threaded hinge pin for a removable vehicle component, such as a door.

BACKGROUND

Some vehicles including components, like doors, that are connected a body of the vehicle by hinge. The component may be removed from the vehicle by removing a hinge pin from the hinge, and reconnected to the vehicle by replacing and securing the hinge pin in the hinge. To avoid unintended disconnection of the component from the vehicle, the hinge pin may be threaded and coupled to a nut of conventional construction and having a circumferentially continuous sidewall defining a threaded cylindrical cavity in which the threaded portion of the pin is received. Variations or tolerances within a production run of parts may cause issues with reliable reinstallation of the vehicle component on the hinge. For example, if the threaded portion of the pin is longer than the nut cavity in which the threaded portion is received, or if the nut or pin is overly torqued during installation, the nut or threaded pin portion may be damaged or broken.

SUMMARY

In at least one implementation, a nut for a hinge pin includes a head and a sidewall portion extending from the head to a free end. The sidewall portion includes at least one void that defines part of at least one sidewall section. The void extends radially through the sidewall portion and along at least part of the axial extent of the sidewall portion including the free end so that the free end of the sidewall portion is not circumferentially continuous.

In at least some implementations, two voids are provided and the sidewall portion includes two sidewall sections. The voids may extend from a free end of the sidewall portion to the head so that the sidewall sections are spaced apart from each other along their full axial length and may bend relative to each other. The sidewall sections may define portions of a cylinder, and the sidewall portion may include internal threads along at least part of an interior surface of the sidewall sections for threaded engagement with a hinge pin. In at least some implementations, the head includes a void outboard of the sidewall portion, and the void may extend axially through the head.

In at least some implementations, a hinge for a removable component of a vehicle, includes first and second hinge parts, a hinge pin and a nut. The first hinge part is coupled to the vehicle or the component and the second hinge part is coupled to the other of the vehicle or the component. Each hinge part may include a passage in which the hinge pin is at least partially received. The nut has a head, a sidewall portion extending from the head to a free end, and at least one void that defines part of at least one sidewall section. The void extends radially through the sidewall portion and along at least part of the axial extent of the sidewall portion including the free end so that the free end of the sidewall portion is not circumferentially continuous. In at least some implementations, a tubular bearing is received at least partially in the passage of one or both of the first hinge part and second hinge part, and at least part of the hinge pin is received within the bearing.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 4 is a cross-sectional view through a center of the hinge pin and nut;

FIG. 5 is an enlarged sectional view of a portion of FIG. 4;

DETAILED DESCRIPTION

Figure 1:
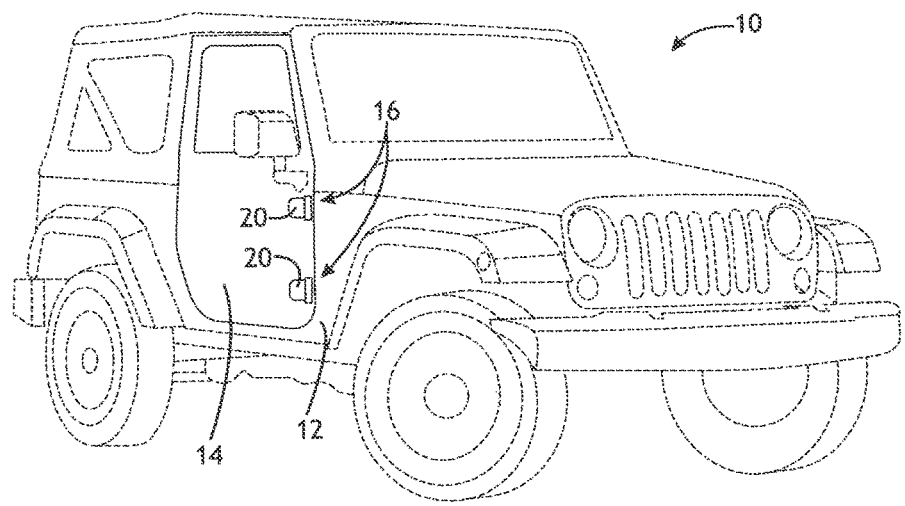
FIG. 1 is a perspective view of a vehicle having a door removably connected to a vehicle body by a couple of hinges.

Referring in more detail to the drawings, FIG. 1 illustrates a vehicle 10 having a body 12 and a door 14 coupled to the body by one or more hinges 16, with two hinges shown in this example vehicle. As shown in FIGS. 2-5, each hinge 16 includes a first part 18 coupled to the vehicle body 12 and a second part 20 coupled to the door 14. A hinge pin 22 may couple the two hinge parts 18, 20 together, and thereby couple the door 14 to the vehicle body 12 so that the door may swing or pivot about the pin 22 and relative to the vehicle body between open and closed positions. The hinge parts 18, 20 may be disconnected to permit the vehicle door 14 to be removed from the vehicle body 12 and reconnected to reconnect the door to the vehicle body 12.

One or both of the hinge parts 18, 20 may define at least part of a passage 26 through which the hinge pin 22 coaxially extends and in which the hinge pin rotates as the door 14 is pivoted relative to the vehicle body 12 between the open and closed positions of the door. In the example shown, the first hinge part 18 includes a tubular portion 24 with a bore 25 and the second hinge part 20 includes a similar tubular portion 28 with a bore 30 that collectively define the passage 26.

Figure 2:
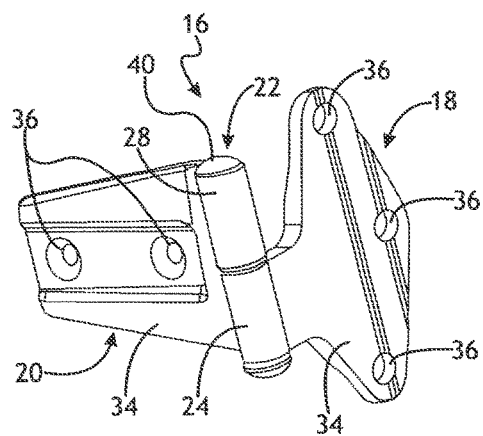
FIG. 2 is an enlarged perspective view of one of the hinges in an assembled state.

In the example shown, the hinge pin 22 extends completely through the bore 30 in the tubular portion 28 of the second hinge part 20, and the hinge pin may be press-fit, bonded or welded to the second hinge part, if desired, or the hinge pin 22 and second hinge part 20 may be integrally formed together such they are one piece. These arrangements reduce the number of separable components and simplify handling of the hinge parts when they are assembly to the vehicle and door, and also disconnection and reconnection of the door 14 to the vehicle body 12. Of course, the hinge pin 22 and second hinge part 20 could rotate relative to each other if desired. The hinge pin 22 could instead be coupled to or carried by (i.e. fixed to or in one piece with) the first hinge part 18. Or, the hinge pin 22 could be separate and/or separable from the both the first and second hinge parts 18, 20 which may each define part of the passage 26 in which the pin 22 is received. A radially extending stop surface 32 may be defined by an end of the tubular portion 28, from which the hinge pin 22 extends, to engage the first hinge part 18 and properly locate the door 14 relative to the vehicle body 12. In addition, as shown in FIG. 2, both the first hinge part 18 and second hinge part 20 may include mounting plates 34 coupled to the tubular portions 24, 28 and or portion carrying the hinge pin 22, with openings 36 in the plates 34 to receive fasteners to couple the hinge parts 18, 20 to the vehicle body 12 and door 14, respectively.

Figure 3:
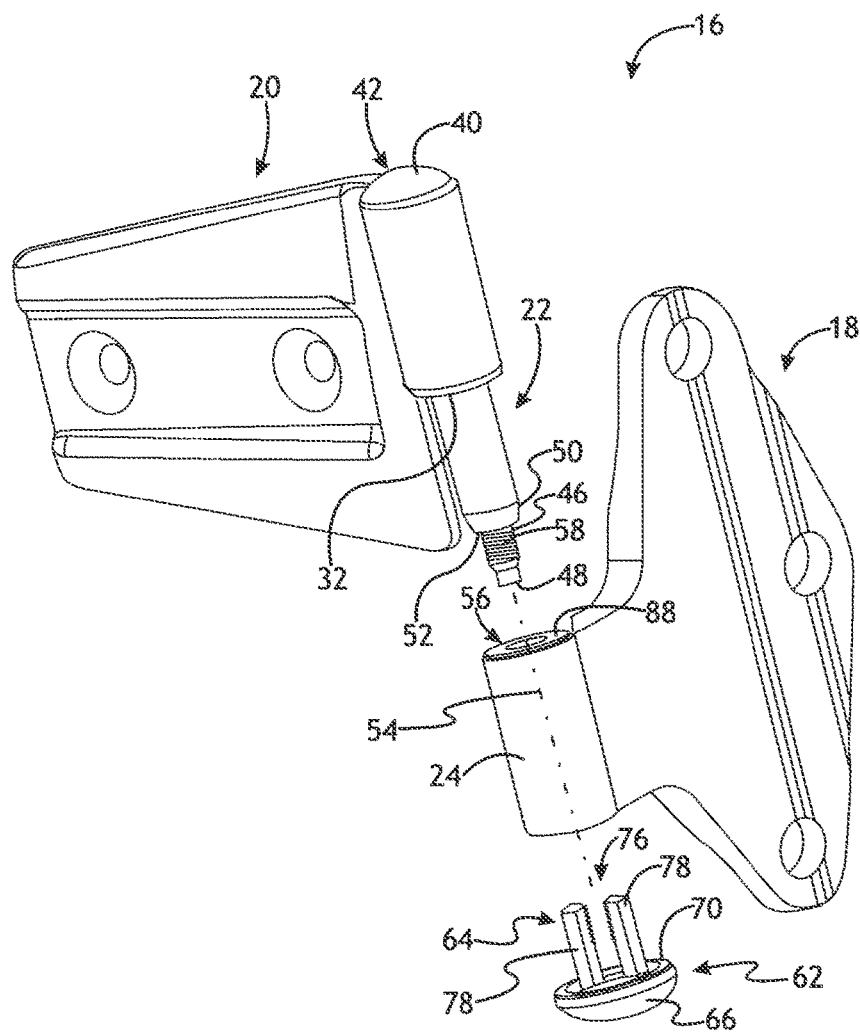
FIG. 3 is a perspective exploded view of the hinge showing a threaded hinge pin and a nut.
Figures 6, 7:
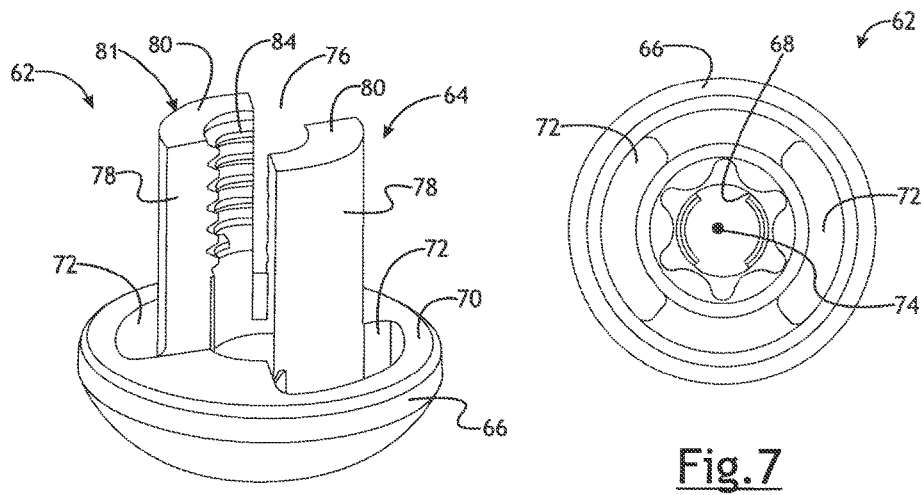
FIG. 6 is a perspective view of the nut.
FIG. 7 is a top view of the nut.
Figures 8, 9:
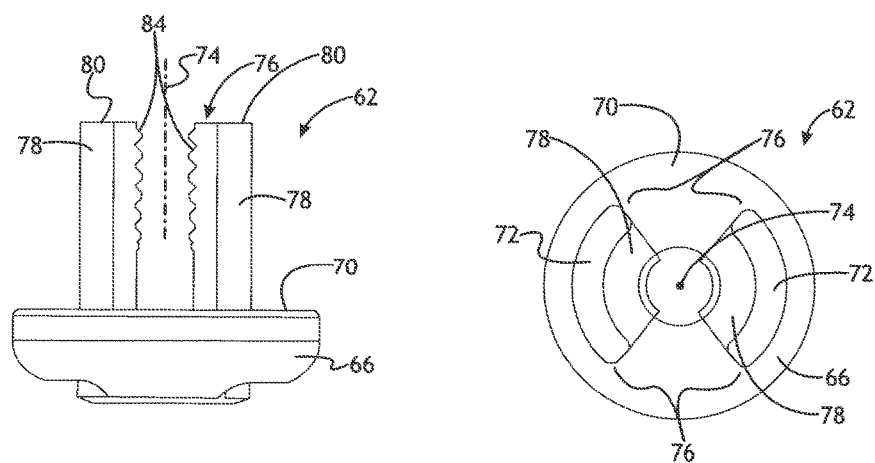
FIG. 8 is a side view of the nut.
FIG. 9 is a bottom view of the nut.

As best shown in FIGS. 3-5, the hinge pin 22 may include, in at least some implementations, an enlarged head 40 at one end 42 (which, in assembly, overlies an end of the tubular portion 28 of the second hinge part 20) and unthreaded portion 44 and a threaded portion 46 extending from the unthreaded portion to a free end 48 of the hinge pin 22. A transition portion 50 may be defined between the unthreaded and threaded portions 44, 46 providing an annular, radially tapered or radially extending surface 52 at the junction to the threaded portion 46. The surface 52 may be generally perpendicular to the axis 54 of the hinge pin 22, where generally perpendicular includes angles within 30 degrees of perpendicular. The unthreaded portion 44 may have an outer diameter of a size to be closely received within the tubular portion 24 of the first hinge part 18. If desired, a tubular bushing or bearing 56 may be received between at least part of the hinge pin 22 and at least part of the tubular portion 24 of the first hinge part 18 to reduce friction and journal the hinge pin for rotation relative to the first hinge part.

The threaded portion 46 may have an outer diameter that is less than the outer diameter of the unthreaded portion 44, where the outer diameter is taken at the outer edge of one or more threads 58 provided about the exterior of the threaded portion 46. Thus, a space 60 exists between the interior of the tubular portion 24 and the exterior of the threaded portion 46, or between the interior of the bushing or bearing 56 and the exterior of the threaded portion 46 in implementations wherein a portion of the bushing or bearing is radially between the first hinge part 18 and the threaded portion 46 of the hinge pin 22, as in the example shown in FIGS. 4 and 5.

A nut 62 may be provided to retain the hinge pin 22 within the passage 26 in assembly. The nut 62 may include a sidewall portion 64 coupled to an enlarged head 66. The head 66 may include a tool receiving feature 68 adapted to receive a tool for rotation of the nut 62. The head 66 may also include a radially extending stop surface 70 adapted to engage the first hinge part 18 as will be set forth in more detail below. In at least some implementations, to reduce weight or for other reasons, the head 66 may include on or more voids 72 therein. In the example shown, the voids 72 extend axially through the head 66, are radially outboard of the sidewall portion 64 and extend for a limited circumferential extent relative to an axis 74 of the nut 62. The sidewall portion 64 may include at least one void 76 that renders at least part of the sidewall portion discontinuous or not circumferentially complete. In other words, not a complete cylinder (in implementations where the outer surface of the sidewall portion is cylindrical). The voids 76 may extend to the free end of the sidewall 64 so that the free end is not circumferentially continuous. In other words, the free end is not defined by a surface that is at a fixed distance from the head along a full circumference or annular extent. With one void, the sidewall portion 64 would be generally C-shaped and with two or more voids, the sidewall portion 64 is defined by sidewall sections 78 that are separate from each other along at least part of the axial length of the sidewall portion. The void 76 may extend through the radial thickness of the sidewall portion 64, along part or all of the axial length of the sidewall and along any desired circumferential extent. In the illustrated implementation, two voids 76 are provided that extend the full axial length of the sidewall sections 78 such that the sidewall sections 78 are separate from each other along their full axial length. As noted above, one or more than two voids 76 may also be provided, if desired, resulting in one or more than two sidewall sections 78.

The sidewall sections 78 may be cantilevered to the head 66 and extend to a free end 80 spaced from the head. The free ends 80 of each section 78 may collectively define a free end 81 of the sidewall portion 64 generally. The sidewall sections 78 may be equally radially spaced from the axis 74 and each may have a radially inner surface 82 that defines a portion of a cylinder. Further, the inner surface 82 of each sidewall section 78 may include grooves or portions of one or more threads 84. So constructed and arranged, the sidewall sections 78 are adapted to be received within the space 60 and to threadedly receive between them the threaded portion 46 of the hinge pin 22, with the threads 58 of the hinge pin 22 meshed with or overlapped by the threads 84 in the sidewall sections inner surface 82. To maintain the nut 62 coupled to the hinge pin 22 in assembly, the sidewall sections 78 may collectively circumferentially span between 90 and 340 degrees relative to the axis 74, or about 25% and 95% of a cylinder. Further, the voids 72 in the head 66 may be located radially outboard of the sidewall sections 78, if desired, and may accommodate some outward bending or flexing of the sidewall sections relative to the head. Finally, the sidewall sections 78 may have a radial width or thickness that enables the sidewall sections to be received within the tubular portion 24 of the first hinge part 18 or within the bushing or bearing 56 if present radially outboard of the sidewall sections 78 in an implementation. That is, the outer surface of the sidewall sections 78 may span part of a cylinder having an outer diameter that is less than the inner diameter of the bushing/bearing 56 or the passage 26 in the tubular portion 24 of the first hinge part 18.

In assembly, as best shown by FIGS. 3-5, the hinge pin 22 extends from the second hinge part 20 and is axially inserted into the bore 25 of the first hinge part 18, and the stop surface 32 of the second hinge part 20 may engage the first hinge part 18 or an annular and radially outwardly extending flange 88 (FIGS. 3 and 4) of the bushing/bearing 56 received between the tubular portions 24, 28 of the first and second hinge parts 18, 20. In this position, the threaded portion 46 of the hinge pin 22 is received within the tubular portion 24 of the first hinge part 18. The nut 62 may then be threaded onto the hinge pin 22 from the opposite end of the tubular portion 24. The head 66 of the nut 62 is radially larger than the passage 26 in the tubular portion 24 such that the head 66 cannot be received within the passage 26 of the tubular portion 24. Thus, the tubular portions 24, 28 of the hinge parts 18, 20 are trapped between the head 40 of the hinge pin 22 and the head 66 of the nut 62.

If the nut 62 is overtightened or over torqued, the sidewall sections 78 will tend to deflect outwardly upon engagement with the transition surface 52 between the unthreaded and threaded sections 44, 46 of the hinge pin 22. This reduces the force transmitted to the hinge pin 22 and reduces the likelihood or prevents the hinge pin from breaking. Outwardly flexing or bending of the sidewall sections 78 is limited by engagement of an outer surface of the sidewall sections 78 with an interior of the bearing 56 or the tubular portion 24 of the first hinge part 18. Thus, in at least some implementations, even if the sidewall sections 78 are deflected upon installation on the hinge pin 22, the sidewall sections and the hinge pin do not break, and their threads 58, 84 remain overlapped sufficiently to hold the door 14 to the vehicle body 12, even in a situation wherein the vehicle 10 tips significantly or becomes inverted such that gravity would tend to remove the second hinge part 20 from the first hinge part 18. Compared to the hinge pin 22, the nut 62 may be relatively inexpensive and hence, replacing a damaged nut is less costly than replacing a hinge pin. Further, if the hinge pin 22 fails, the door 14 is not securely retained to the vehicle body 12 as the nut 62 would fall away from the hinge 16 under the force of gravity.

While shown and described primarily with reference to a removable vehicle door, the hinge pin 22 and nut 62 used therewith may be used with other removable components or panels of a vehicle such as a roof, hood or the like.

What is claimed is:

1. A nut for a hinge pin, comprising:
   a head; and
   a sidewall portion extending from the head to a free end and including at least one void that defines part of at least one sidewall section, wherein the void extends radially through the sidewall portion and along at least part of the axial extent of the sidewall portion including the free end so that the free end of the sidewall portion is not circumferentially continuous, where the terms axial, radial and circumferential relate to an axis of the nut, wherein when not coupled to another component the sidewall portion includes an inner surface that defines part of a cylinder and an outer surface that defines part of a cylinder, and wherein the inner surface that defines part of a cylinder includes at least one thread;
   wherein the head includes a void outboard of the sidewall portion and enclosed radially between the sidewall portion and the head.

2. The nut of claim 1 wherein two voids are provided and the sidewall portion includes two sidewall sections.

3. The nut of claim 2 wherein the voids extend from a free end of the sidewall portion to the head so that the sidewall sections are spaced apart from each other along their full axial length and may bend relative to each other.

4. The nut of claim 1 wherein the sidewall portion includes internal threads along at least part of an interior surface of the sidewall sections.

5. The nut of claim 1 wherein the void of the bead extends axially through the head.

6. The nut of claim 2 wherein the sidewall sections define portions of a cylinder.

7. A hinge for a removable component of a vehicle, comprising:
   a first hinge part adapted to be coupled to the vehicle or the component, the first hinge part defining at least part of a passage;
   a second hinge part adapted to be coupled to the other of the vehicle or the component, the second hinge part defining at least part of a passage;
   a hinge pin having a threaded portion, and wherein the hinge pin extends through part of one of the first hinge part and second hinge part and at least partially into the passage of the other of the first hinge part and second hinge part; and
   a nut having a head and a sidewall portion extending from the head to a free end, the nut also having at least one void that defines part of at least one sidewall section, wherein the void extends radially through the sidewall portion and along at least part of the axial extent of the sidewall portion including the free end so that the free end of the sidewall portion is not circumferentially continuous, where the terms axial, radial and circumferential relate to an axis of the nut, and wherein the nut includes an inner surface that defines part of a cylinder and an outer surface that defines part of a cylinder, and the inner surface that defines part of a cylinder includes at least one thread engaged with the threaded portion of the hinge pin, and the sidewall portion is received at least partially within a passage of either the first hinge part or second hinge part, wherein the head includes a void outboard of the sidewall portion and enclosed radially between the sidewall portion and the head.

8. The hinge of claim 7 wherein two voids are provided and the sidewall portion includes two sidewall sections.

9. The hinge of claim 8 wherein the voids extend from the free end of the sidewall portion to the head so that the sidewall sections are spaced apart from each other along their full axial length and may bend relative to each other.

10. The hinge of claim 7 wherein the void in the head extends axially through the head.

11. The hinge of claim 7 which also includes a tubular bearing received at least partially in the passage of one or both of the first hinge part and second hinge part, and wherein at least part of the hinge pin is received within the bearing.

12. The hinge of claim 7 wherein the hinge pin includes an unthreaded portion and a radially tapered surface between the threaded portion of the hinge pin and the unthreaded portion, and wherein the radially tapered surface tends to deflect the sidewall portion radially outwardly upon engagement of the sidewall portion with the radially tapered surface.

13. The hinge of claim 7 wherein the head includes a radially extending stop surface that engages the hinge part that has the passage in which the sidewall portion is at least partially received to limit axial movement of the sidewall portion into the passage in which it is received.

14. The nut of claim 1 wherein the at least one thread is interrupted by the void such that the at least one thread is not circumferentially continuous.

15. A nut for a hinge pin, comprising: a head; and a sidewall portion extending from the head to a free end and includes at least two sidewall voids that define part of at least two sidewall sections, wherein the sidewall voids extend radially through the sidewall portion and along at least part of the axial extent of the sidewall portion including the free end so that the free end of the sidewall portion is not circumferentially continuous, where the terms axial, radial and circumferential relate to an axis of the nut, wherein when not coupled to another component the sidewall portion includes an inner surface that defines part of a cylinder and an outer surface that defines part of a cylinder, wherein the inner surface that defines part of a cylinder includes at least one thread, and the head includes a void outboard of and circumferentially aligned with each sidewall section and enclosed radially between the sidewall section and the head.

* * * * *